US007181551B2

(12) United States Patent
Grishaw et al.

(10) Patent No.: US 7,181,551 B2
(45) Date of Patent: Feb. 20, 2007

(54) BACKWARD-COMPATIBLE PARALLEL DDR BUS FOR USE IN HOST-DAUGHTERCARD INTERFACE

(75) Inventors: James Everett Grishaw, Santa Clara, CA (US); Mickey Ramal Henniger, Buchanan Dam, TX (US)

(73) Assignee: Cisco Technology, Inc., San Jose, CA (US)

( * ) Notice: Subject to any disclaimer, the term of this patent is extended or adjusted under 35 U.S.C. 154(b) by 382 days.

(21) Appl. No.: 10/688,446

(22) Filed: Oct. 17, 2003

(65) Prior Publication Data

US 2005/0086409 A1    Apr. 21, 2005

(51) Int. Cl.
*G06F 3/00*    (2006.01)
(52) U.S. Cl. ............................. 710/11; 713/1
(58) Field of Classification Search .................. 710/10, 710/11, 14; 711/170; 713/1
See application file for complete search history.

(56) References Cited

U.S. PATENT DOCUMENTS

| 5,249,280 | A |   | 9/1993 | Nash et al. |
| 5,675,807 | A | * | 10/1997 | Iswandhi et al. ............ 710/260 |
| 5,805,833 | A | * | 9/1998 | Verdun ........................ 710/303 |
| 6,598,109 | B1 | * | 7/2003 | McAlister et al. .......... 710/306 |
| 6,772,249 | B1 | * | 8/2004 | Lada et al. .................. 710/100 |
| 6,883,171 | B1 |   | 4/2005 | Bittner et al. |
| 6,904,506 | B2 | * | 6/2005 | Wu et al. ..................... 711/170 |
| 6,990,549 | B2 | * | 1/2006 | Main et al. .................. 710/306 |
| 2004/0010739 | A1 | * | 1/2004 | Odom et al. ................. 714/724 |
| 2004/0035939 | A1 | * | 2/2004 | Lin ............................ 235/487 |

OTHER PUBLICATIONS

CISCO Systems, *CISCO 1700 Series Modular Access Routers*, Data Sheet, copyright 1992-2004 Cisco Systems, Inc., San Jose, California, downloaded from the Internet: <http://www.cisco.com/en/US/products/hw/routers/ps221/products_data_sheet09186a0080088713.html>.
CISCO Systems, *G.shdsl WAN Interface Card for the Cisco 1700 Series*, Data Sheet, copyright 1992-2001 Cisco Systems, Inc., San Jose, California, downloaded from the Internet: <http://www.cisco.com/warp/public/cc/pd/rt/1700/prodlit/wic17_ds.pdf>.
CISCO Systems, *Overview of Cisco Interface Cards*, Cisco Interface Cards Installation Guide, Chapter 1, Cisco Systems, Inc., San Jose, California, downloaded from the Internet: <http://www.cisco.com/univercd/cc/td/doc/product/access/acs_mod/cis2600/hw_inst/wic_inst/wic_doc/prepwanm.pdf>.

* cited by examiner

*Primary Examiner*—Rehana Perveen
*Assistant Examiner*—Clifford Knoll
(74) *Attorney, Agent, or Firm*—Charles E. Krueger

(57) ABSTRACT

A host-daughtercard interface is pin compatible with a legacy interface but redefines a subset of pins to implement a high-bandwidth double data-rate (DDR) bus. By inspecting a cookie on the daughtercard, the host platform determines whether the daughtercard supports the DDR bus or the legacy interface, and then configures the subset of pins to implement the legacy interface or the DDR bus.

8 Claims, 5 Drawing Sheets

| Command Opcode | Address | CRC8 |
|---|---|---|
| 0x01 | 32 Bits | 8 bits |

Fig. 6A

| Command Opcode | Address | Data | CRC8 |
|---|---|---|---|
| 0x02 | 32 Bits | 8 bits | 8 bits |

Fig. 6B

| Command Opcode | Address | Data | CRC8 |
|---|---|---|---|
| 0x08 | 32 Bits | 8 bits | 8 bits |

Fig. 7A

| Command Opcode |
|---|
| 0x1F |

Fig. 7B

| Command Opcode | Source | CRC8 |
|---|---|---|
| 0x0C | 16 bits | 8 bits |

Fig. 8

| Command Opcode | Data | (Optional) Rx Flags | CRC8 |
|---|---|---|---|
| 0x11 | N bytes | 8 bits | 8 bits |

Fig. 9

| DMA Read Opcode | Address | Length | CRC8 |
|---|---|---|---|
| 0x61 | 32 bits | 16 bits | 8 bits |

Fig. 10

| DMA Read Response Opcode | Address | Length | Header CRC8 | Data | Frame CRC8 |
|---|---|---|---|---|---|
| 0x62 | 32 bits | 16 bits | 8 bits | "Length" bytes | 8 bits |

Fig. 11

| DMA Write Opcode | Address | Length | Header CRC8 | Data | Frame CRC8 |
|---|---|---|---|---|---|
| 0x66 or 0x67 | 32 bits | 16 bits | 8 bits | "Length" bytes | 8 bits |

Fig. 12

BACKWARD-COMPATIBLE PARALLEL DDR BUS FOR USE IN HOST-DAUGHTERCARD INTERFACE

BACKGROUND OF THE INVENTION

Incompatibility between new and existing products is a major problem in many technical disciplines including networking and signal switching. Often new products are developed having increased data rates but customers have invested heavily in legacy products operating at a slower data rate.

For example, many routing platforms have slots for WAN (Wide Area Network) Interface Cards (WICs) that provide interfaces between the routing platform and wide area networks.

The legacy WICs were conceived several years ago, and originally targeted PHY devices with a maximum bit rate of a few Mbps. Since then, the explosion of the internet and broadband availability has enormously increased the speed and complexity required of Cisco router interfaces. There is a need to expand the legacy WIC functionality to enable existing routing platforms to continue to meet present as well as future interface card requirements.

BRIEF SUMMARY OF THE INVENTION

In a first embodiment of the invention, pins of a legacy host-daughtercard interface are appropriated to define a high-speed parallel bus in a new high-speed interface that is backward compatible with the legacy interface.

In another embodiment of the invention, data and control frames are transmitted over the high-speed parallel bus where a control line is asserted to distinguish between data and control frames.

In another embodiment of the invention, the pins appropriated functioned as a parallel port in the legacy interface and the host utilizes read and write frames to perform the function of a legacy parallel port in the high-speed interface.

In another embodiment of the invention, an interrupt control frame is utilized by the daughtercard to interrupt a processor on the host platform.

In another embodiment of the invention, address extension bits are held in a register to extend the buffer addresses held in a descriptor in host memory.

In another embodiment of the invention, a cookie on the daughtercard indicates whether the daughtercard supports the legacy interface or the new high-speed interface. The host reads the cookie to determine which interface is supported.

Other features and advantages of the invention will be apparent from the following detailed description and appended drawings.

BRIEF DESCRIPTION OF THE DRAWINGS

FIGS. 6A and B are diagrams depicting the format of the 8-bit HWIC read and read response commands;

FIGS. 7A and B are diagrams depicting the format of the 8-bit HWIC write and write response commands;

FIG. 8 is a diagram depicting the format of the interrupt control frame;

FIG. 9 is a diagram depicting the format of the Generic data frame;

FIG. 10 is a diagram depicting the format of the HWIC-to-host DMA Read Request Frame;

FIG. 11 is a diagram depicting the format of the Host-to-HWIC DMA Read Response; and FIG. 12 is a diagram depicting the HWIC-to-host DMA Write Request.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The invention will now be described with reference to various embodiments implemented in a routing platform. In the following, the term routing platform is utilized broadly to include any component such a router, bridge, switch, layer 2 or layer 3 switch, gateway, etc., that refers to components utilized to implement connectivity within a network or between networks. In the following, embodiments will be described, by way of example, not limitation, that operate on routing platforms designed and manufactured by the assignee of the present patent application. However, it is understood by persons of skill in the art that the invention has broad utility in any routing platform.

A brief overview of an embodiment of the invention will now be described. In the following, for ease of description, the current embodiment will be denoted the High-speed WAN Interface card (HWIC).

The legacy WIC/Host interface includes a number of serial interfaces and a parallel interface. In the presently described embodiment of the HWIC the physical interface is kept the same as the legacy WIC/Host interface so the legacy VWIC modules are pin compatible and may be inserted into host platforms built for the new HWIC interface. In order to maintain compatibility with existing VWICs, i.e., VICs (Voice Interface Cards) and WICs, this embodiment of the HWIC contains the WIC/VIC Serial Peripheral Interface (SPI) and may contain some combination of WIC/VIC Serial Interfaces. For those serial interfaces, the interface requirements, pin definitions, interface operations, and interface timings are identical to those of the legacy WIC/VIC.

This compatibility is further achieved by appropriating pins of the legacy WIC/Host interface for new functions. The detailed appropriation of pins for a specific interface, designed and manufactured by the assignee of the present application, will now be described by way of example not limitation.

Figure 1:
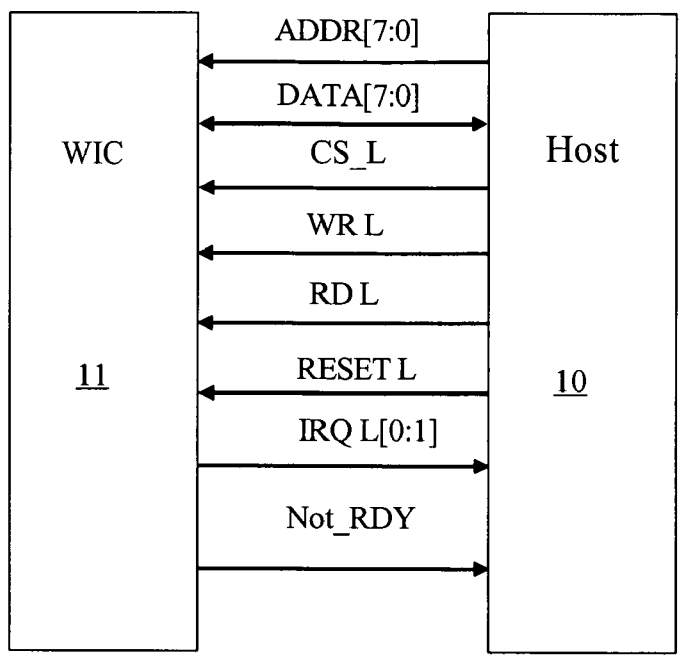
FIG. 1 is a block diagram of a legacy Host/WIC interface.

The legacy WIC/Host parallel interface is depicted in FIG. 1 and is a generic 8-bit parallel bus which functions as a parallel port to allow the host to access the legacy WIC's on-board registers as well as other network devices. This legacy WIC/Host interface includes a byte oriented bus, connecting a host 10 and WIC 11, with which the host must be able to access any legacy WIC's address located in the odd or even byte boundary.

The signals depicted in FIG. 1 are: RD_L: Read signal; WR_L: Write signal; CS_L: enable signal; Not_RDY: not ready signal which is asserted (LOW) when the data is not ready; ADDR[7:0]: Address bus; and DATA[7:0]: Data bus.

Figure 2:
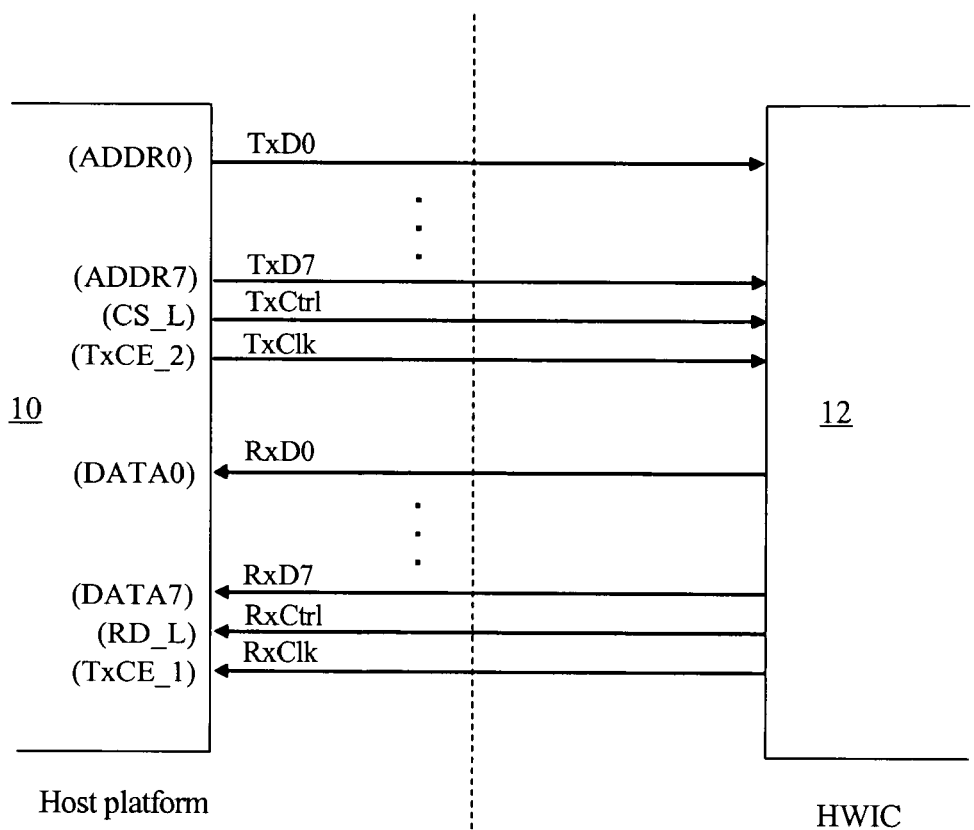
FIG. 2 is a block diagram of an embodiment of the parallel DDR bus.

In addition to the legacy interfaces above, the HWIC of the presently described embodiment supports an 8-bit double-data rate (DDR) bi-directional bus depicted in FIG. 2. This DDR bus is a synchronous bus. This interface will be used to: 1) provide a high-speed data path between the host platform and the HWIC for WAN data; 2) provide access to the module's on-board registers; and, 3) to provide a DMA path for HWIC on-board devices.

In this embodiment, TxClk and RxClk run at 25 MHz. The buses operate in Double Date Rate (DDR) mode, where data is captured on every clock edge. This provides aggregate bandwidth of 800 Mbps (400 Mbps in each direction).

The signals depicted in FIG. 2 are: TxD[7:0]: Transmit Data bus from host; TxCtrl: Transmit Control bit from host; TxClk: Transmit Clock from host; RxD[7:0]: Receive Data bus to host; RxCtrl: Receive Control bit to host; and, RxClk: Receive Clock to host.

In this embodiment, the ADDR[7:0] (Address pins) of the legacy Host/WIC parallel interface have been appropriated as the TxD[7:0] (Transmit Data bus from host) in the DDR bus of the Host/HWIC interface. Also, the data pins of the DATA[7:0] (Data bus) of the legacy Host/WIC parallel interface have been appropriated as the RxD[7:0] (Receive Data bus to host) in the DDR bus of the Host/HWIC interface. Additionally, the CS_L (enable signal) of the legacy interface has been appropriated as the TxCrl pin of the Host/HWIC interface and the RD_L pin of the legacy Host/WIC interface has been appropriated as the RxCtrl pin of the Host/HWIC interface. Further, the legacy Host/WIC parallel interface echo clock pins have been appropriated as the TxClk and RxClk pins in the DDR bus of the Host/HWIC interface.

As described above, the new HWIC interface is plug compatible with the legacy WIC/Host interface. However, the functionality of some of the pins will differ in the new implementation.

Note that, in the presently-described embodiment, only the parallel port pins and the "Echo Clock" (TxCE) pins of the legacy Host/WIC parallel interface are cannibalized for the HWIC high-speed bus. This provides for backwards compatibility by still leaving the SPI lines, SCC's (Serial Communication Controllers), interrupt lines etc available for their traditional uses in the legacy Host/WIC parallel interface.

Figure 3:
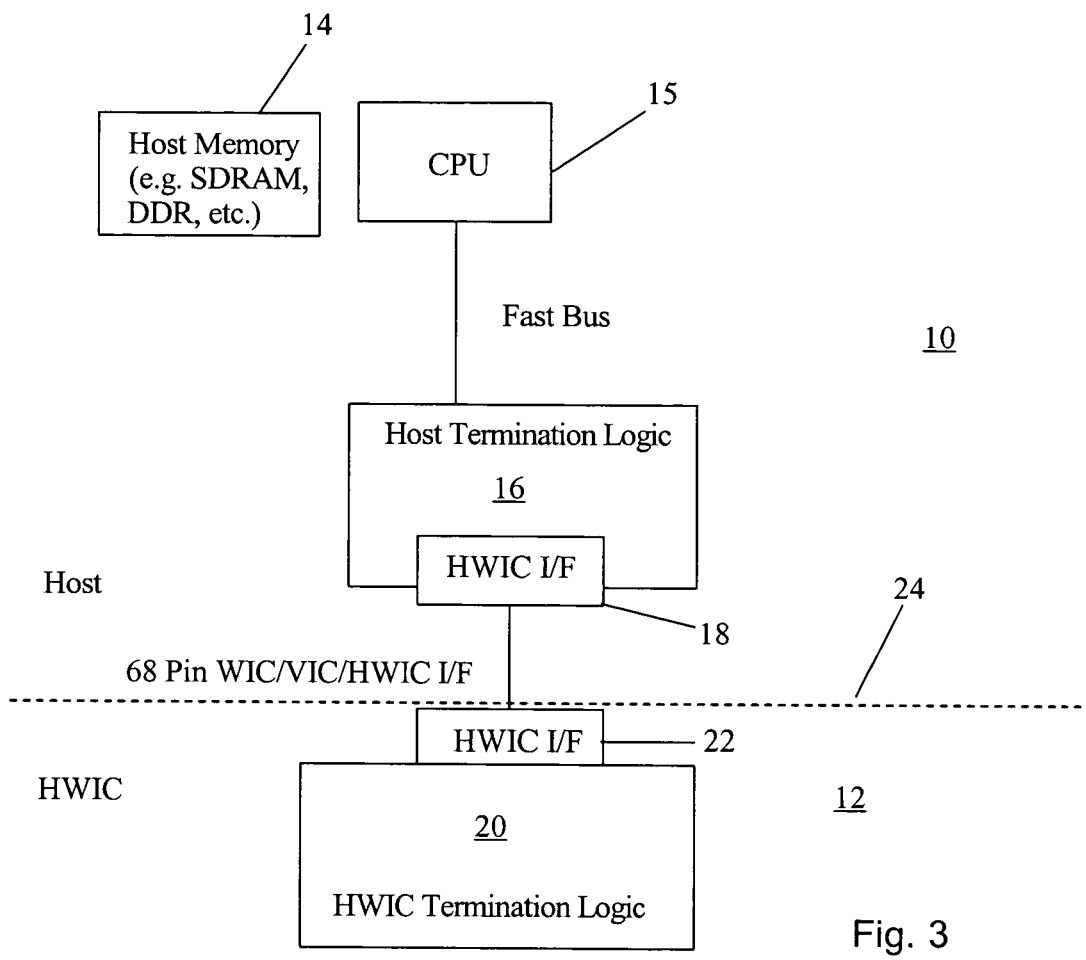
FIG. 3 is a high-level block diagram of an embodiment of the host-WIC system.

FIG. 3 is a high-level block diagram of the host-WIC system. In FIG. 3 the host 10 includes host memory 14 and a CPU 15 coupled to a host termination logic block 16 including an HWIC interface 18. The HWIC 12 includes an HWIC terminating logic block 20 including a an HWIC interface 22. The host HWIC interface 22 is coupled to a 68-pin connector 24, which as described above, is pin compatible with the legacy HWIC connector.

Figure 4:
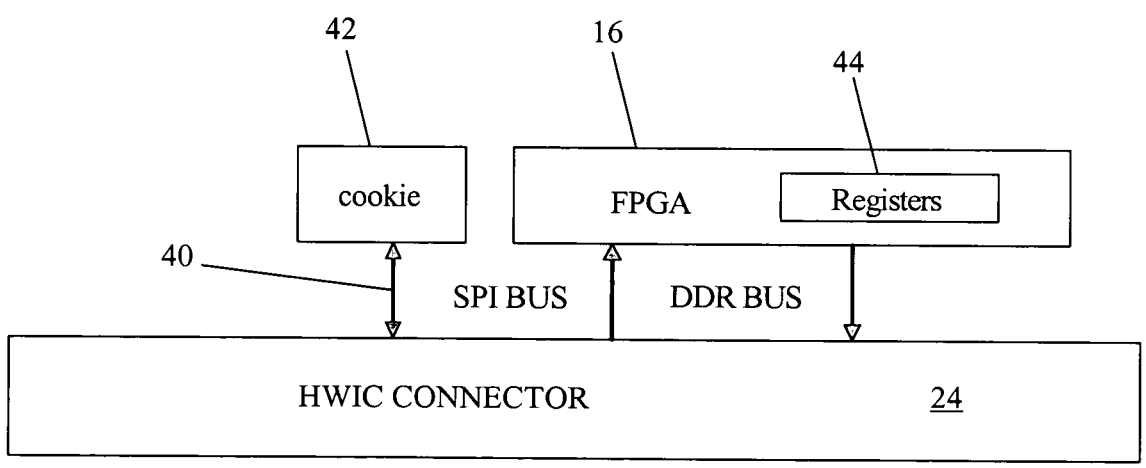
FIG. 4 is a more detailed diagram of the HWIC interface to the HWIC connector.

FIG. 4 is a more detailed diagram of the HWIC interface 22 coupled to the HWIC connector 24. The principal components from the HWIC side are the Serial Peripheral Bus (SPI) 40 connected to a cookie 42, in this embodiment a non-volatile memory, such as an non-volatile RAM (NVRAM) in the form of an EEPROM, storing information about a particular implementation, the HWIC DDR parallel bus coupled to the HWIC termination logic 16, in this embodiment an FPGA including a set of configurable registers 44, and a power pin (not shown) for supplying power to the HWIC. In this embodiment, the FPGA includes registers are utilized for configuring the HWIC.

An important component of backward compatibility is providing the host with a system for determining whether a legacy or upgraded part has been inserted in the slot. In the presently described embodiment this function is required because, although the parts are pin compatible, certain pins are used to perform completely different functions. The system for implementing card identification and preventing problems due to incompatible signals will now be described.

In this embodiment, an HWIC can be plugged into an older host platform, where the old host platform can still access the cookie on the HWIC via the SPI lines and find out that this inserted WIC is not supported. The HWIC will be required to not drive the Rx lines until "enabled", so that the WIC parallel port bus pins will not cause bus contention in the event that an HWIC is inserted into an older host platform. Also, by design the legacy SCC's are still available on an HWIC and can be used for purposes such as management channels.

Figure 5:
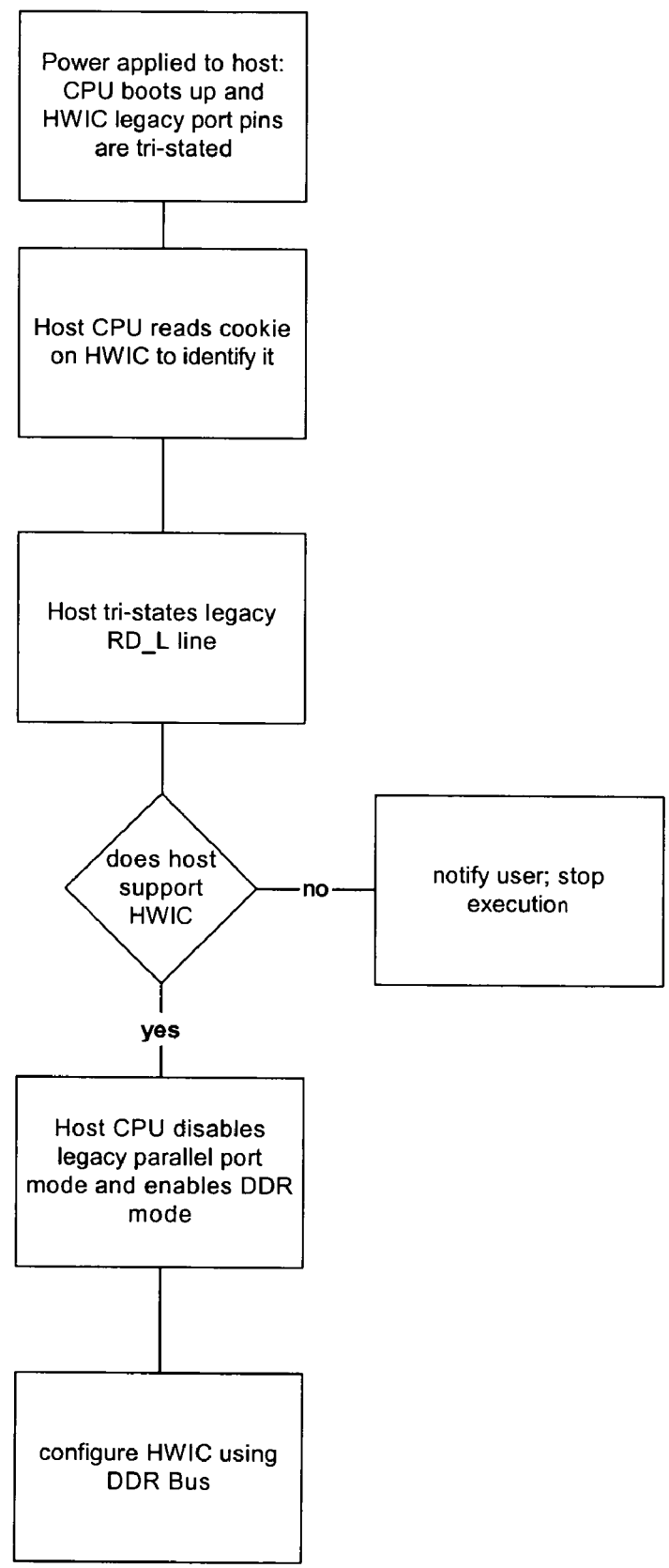
FIG. 5 is a flow chart of an embodiment of the steps for distinguishing between a legacy and HWIC interface.

The procedure for powering up the HWIC of the currently described embodiment and facilitating compatibility with the legacy Host/WIC parallel interface will now be described in detail with reference to the flow chart of FIG. 5.

1. Power is applied to the host platform, and the host CPU boots up. Alternatively, the host CPU issues a hard reset to the HWIC (in response to "clear interface" or some other reason to start over from scratch).
2. If the HWIC has an on-board configuration ROM for its FPGA, the HWIC FPGA is automatically (re)configured. However, the HWIC continues to tri-state the legacy parallel port pins: Addr[7:0], Data[7:0], nCS, nRD, nWR, nRDY.
3. The host CPU uses the SPI to read the NVRAM on the HWIC and identify it. If the platform is older or otherwise does not support this type of HWIC, a message is displayed to the user and execution stops here.
4. If the HWIC does NOT have an on-board configuration ROM for its FPGA, the host processor downloads the configuration bit stream to the HWIC FPGA by use of the 8-bit parallel port or SPI. Again after download, the HWIC FPGA is tri-stating all of its parallel-port lines (enumerated in (2) above).
5. The host CPU tri-states the RD_L pin to avoid bus contention when the HWIC's DDR mode is enabled.
6. The host CPU turns off (legacy WIC) parallel port mode for this WIC interface and enables HWIC DDR mode in the host termination logic.
7. The host CPU enables HWIC termination logic to drive its 10 HWIC-to-host DDR pins (RxData[7:0], RxClk, and RxCtrl) by writing to a special register in the HWIC termination logic. Note that although the HWIC-to-host DDR pins are tri-stated, the host-to-HWIC pins (TxData [7:0], TxClk, and TxCtrl) are still active so that commands can be transmitted from the host to the HWIC.
8. The host verifies that the HWIC FPGA has been properly downloaded and that the DDR bus is operational by reading an HWIC register through the DDR bus.

9. HWIC configuration continues by means of the HWIC DDR bus.

The operation of the DDR bus itself will now be described in more detail. Two types of frames are defined: control frames and data frames. Data frames are used to pass the larger packets of data between the host and the HWIC, en route to and from the line interface. The control frames are smaller in nature, and, since they perform administrative functions, they pre-empt the data frames in order to reduce latency. There is also another important difference between the two types of frames—the control frame formats are generated and received in hardware, whereas the data frame format is determined by the host processor (with the exception of the DMA frames noted below).

The control bits (RxCtrl, TxCtrl) distinguish data frames from control frames: TxCtrl, RxCtrl="0": indicates that streaming data is being passed, TxCtrl, RxCtrl="1": indicates that control information is being passed. In the present embodiment, the Tx and Rx buses are always transmitting bytes: either control bytes, data bytes, or idle bytes.

Control Frames

The functions and implementations of control frames in the presently described embodiment will now be described. The control frames have three principal functions: 1) flow control by means of stop, resume, and transmit control characters, 2) read/write commands utilized to perform the functions of the legacy parallel port, and, 3) interrupt frames. Each will be described in more detail below.

Turning first to the control frame format, A control frame (or byte) is transmitted if and only if the respective control bit (TxCtrl or RxCtrl is "1"). A data frame is transmitted if and only if the respective control bit (TxCtrl or RxCtrl) is "0". Hence for example a 0xFF transmitted with the control bit set to 1 has a specific meaning (start/end of data frame); whereas a 0xFF transmitted with the control bit set to 0 is to be interpreted as data.

The control Frame characters for implementing flow control will now be set forth in detail.

0xFF: start/end of data frame or IDLE between data frames. Each data frame must begin with the 0xFF control byte, and does not end until the 0xFF control byte is received. Flag sharing (two data frames separated by one 0xFF flag) is allowed.

0xF0: IDLE byte in middle of data frame. This control character can be inserted into the middle of the frame in order to indicate an "IDLE" condition. The receiver will do nothing with this byte other than discard it. The purpose of the IDLE byte is so that the data frames will NEVER underrun on the host/HWIC interface.

0xFA: ABORT. If this control character is encountered, any data frame in progress is immediately terminated, and an "abort" is generated. At least one 0xFF flag must be sent following this to identify the beginning of the next data frame. The ABORT character is required primarily to signal a prematurely terminated the Generic Data Frame. Without the ABORT character it would be difficult to determine a premature termination because the Generic Data Frame does not contain a Length field. However, the ABORT character may also be used to signal premature termination of a DMA Data Frame.

0xF3: Suspend Transmit Request. This control character can be sent either by the host or by the HWIC, to request that the other party suspend transmitting data frames. This is intended for flow control purposes, to prevent the overflow of a FIFO that is becoming full. Upon receiving a "suspend transmit" request, the transmitting party may send a maximum of 32 more bytes before ceasing transmission of all "data frame" bytes.

0xFC: Resume Transmit Request. This control character can be sent either by the host or by the HWIC, to request that the other party resume data frame transmission, after transmission has been suspended by the "Suspend Transmit Request" control byte.

0xC0: Low Water Mark. This control character is sent from the Host Termination Logic to the HWIC when the Receive Queue Count becomes less than or equal to the Receive Queue Low Water Mark register value and the Water Mark control bytes are enabled with Configuration Register bit 7. Once a Low Water Mark control byte is sent, no more Low Water Mark control bytes will be sent until a High Water Mark control byte is sent first.

0xCF: High Water Mark. This control character is sent from the Host Termination Logic to the HWIC when the Receive Queue Count becomes greater than or equal to the Receive Queue High Water Mark register value and the Water Mark control bytes are enabled with Configuration Register bit 7. Once a High Water Mark control byte is sent, no more High Water Mark control bytes will be sent until a Low Water Mark control byte is sent first.

In this embodiment, the HWIC response to the Low Water Mark/High Water Mark control bytes is design-specific. Typical uses might be to enable selective packet dropping on the HWIC (e.g. drop data packets but continue to send control packets if the Receive Buffer Ring is getting full) or as a warning to allow the HWIC to apply flow control to the transmitter on the other side of the line.

The above single-byte control characters may ONLY be inserted into data frames. The 0xF0 IDLE byte cannot be inserted into a control frame, nor do control frames require the 0xFF delimiters (since control frames are of predetermined length).

The read write control commands will now be described in more detail. The legacy WIC parallel port pins have been cannibalized for the HWIC DDR data buses. The read/write control frames replace the lost functionality of the legacy parallel port. The read and write control commands are utilized by the host to read register data from the HWIC over the DDR bus.

In order to maintain the low latency of the legacy parallel port operations, these control frames will immediately be inserted (on a byte boundary) into any data frame that is currently in progress, and the HWIC termination logic will immediately respond, again pre-empting any data frame that may be in progress.

The format of the HWIC read and read response commands for transferring 8 bits of data are depicted in FIGS. 6A and 6B. The read command includes an opcode identifying the type of command, e.g. 8-bit, 16-bit, or 32-bit read, an address, and CRC bits as depicted in FIG. 6A. The read response command includes an opcode identifying the type of command, e.g. 8-bit, 16-bit, or 32-bit read response, address, read data, and CRC bits.

The HWIC read is sent from the host to the HWIC in order to query an indicated memory location. The HWIC will respond with the "8-bit HWIC read response" frame. Upon receiving the "HWIC read" command, the HWIC termination logic will read the HWIC memory location at "Address" and send the resulting data to the host framed as shown in the FIG. 6B.

The format of the HWIC write and write response commands are depicted in FIGS. 7A and B. The write command, depicted in FIG. 7A, includes an opcode identifying the type of command, e.g. 8-bit, 16-bit, or 32-bit write, and address, data to be written, and CRC bits. The write response, depicted in FIG. 7B, includes an opcode.

The HWIC write command is sent from the host to the HWIC in order to write the transmitted data to the desired HWIC memory location. After the HWIC termination logic has successfully completed the write, it will send this byte back to the host in order signal completion. The Host Termination Logic should not initiate the next HWIC read or write command until it has received HWIC write response control byte from the HWIC.

The interrupt control frame will now be described. The format of the interrupt control frame is depicted in FIG. 8. The HWIC interrupt frame is sent from the HWIC to the host upon detection of some interrupt event that is unmasked. The 16 "source" field bits correspond to 16 bits in the HWIC termination logic Interrupt Event Registers. Upon receipt of the HWIC Interrupt frame, the "Source" field will be logically ORed with these Event Register bits to create the new event register bit values. This may in turn interrupt the host processor (if the corresponding event register bit is unmasked).

The use of the HWIC interrupt frame reduces interrupt latencies by eliminating the need for the host to poll the HWIC registers to determine the interrupt source on the HWIC. The HWIC interrupt frame may also be used to alleviate any temptation to have the host CPU poll an HWIC register while waiting for an event to occur (this could severely degrade performance).

Some host platforms support 3 levels of HWIC interrupts to the host—Error interrupt, Management/Config interrupt, and Network interrupt. In order to support hosts that support these three interrupt types, the HWIC Interrupt Frame bits (bits 15–0 of the Source field) are partitioned as follows: Bits 15–12: Error interrupts, Bits 11–8: Management/Config interrupts, Bits 7–0: Network interrupts. Each interrupt group is mapped to a separate Interrupt Enable and Interrupt Event register.

Data Frames

There are two types of data frames: DMA data frames and Generic data frames. They have very different uses.

The following are some of the similarities between DMA and Generic data frames: (1) By definition, a data frame is transmitted if and only if the respective control bit (TxCtrl or RxCtrl) is "0"; (2) All data frames carry a CRC8 as the last byte; (3) All data frames start with an encapsulation header. All Generic data frames start with the 0x11 byte. All DMA data frames begin with 0x61, 0x62, 0x66, or 0x67.

The DMA and Generic data frames have different purposes. On the one hand, the DMA data frame serves as a vehicle for HWIC-initiated DMA transactions. The DMA data frame allows the HWIC to read and write to host memory. DMA data frames are processed entirely in hardware, so it is not necessary for the host processor to be involved in these transactions. For example, simple register accesses are inefficient for reading blocks of registers so DMA frames are utilized to transfer blocks or register data from the HWIC to the host over the DDR bus. The HWIC requires data structures set up in host processor memory to support its Generic Data Frame transmit and receive operations. All of these data structures are shared by the host processor and the host termination logic through DMA accesses.

On the other hand, the Generic data frame will be an implementation-specific frame agreed upon between the host driver software and the HWIC termination logic. For example, a data frame may simply be an IP packet or ATM cell that the HWIC termination logic sends to or receives from the PHY device on the HWIC. Or there may be an encapsulation, such as a header with an 8-bit port number indicating which PHY device the HWIC termination logic sends/receives the packet from. The purpose of the Generic data frame is to allow the HWIC designer the flexibility to create whatever frame format will best suit the specific HWIC being designed.

The DMA and Generic data frames are also processed differently. On the one hand, the DMA data frames originate in hardware (on the HWIC if it is a DMA request, or on the host if it is a DMA response). Upon receipt they are also processed entirely in hardware, leaving the host CPU completely uninvolved in the transaction (until perhaps the very end, after the transaction is completed, when the host is notified via interrupt that a DMA transaction has occurred).

On the other hand, the Generic data frame is processed almost entirely in software on the host side. Any special encapsulations for transmit frames (outside of the initial 0x11 byte) must be created by the host processor. And likewise received frames are also entirely processed by the host processor (after the leading 0x11 byte is removed).

On the HWIC side, by necessity (unless a processor resides on the HWIC) all Generic data frames are processed in hardware, which has carnal knowledge of the HWIC-specific Generic data frame format, that has been agreed upon between the host CPU and the HWIC hardware.

The flexibility of the types of data frames is different. Since the DMA data frame is processed entirely in hardware, it is not flexible and must remain exactly the same format (as described below) from HWIC to HWIC.

Since the Generic data frame is created and parsed by the host processor, the format of the Generic data frame is extremely flexible. It is intended that the host CPU will choose Generic data frame format that will facilitate the design of each particular HWIC.

Generic Data Frames

The format of the Generic data frame will now be described with reference to FIG. 9.

Command Opcode: Generic data frames passed between the HWIC and the host must begin with a 0x11 byte in order to indicate Generic data frame encapsulation.

Data: The "Data" field may be any data of any length (providing of course that it follows the implementation-specific format agreed upon by the host driver software and the HWIC termination logic). For example, this could be an IP packet, ATM cell, or PPP frame, encapsulated with a port number or VC number in the header.

(Optional) Rx Flags: For Generic Data Frames passed from the HWIC to the host platform, the upper 2 bits of the Rx Flags byte are written to the Receive Buffer Descriptor word 1 bits 23–22. This is to allow the convenient passing of error/status information that may not be readily available for insertion into the beginning of the Generic Data Frame, for example line CRC calculations that are not completed until the end of the frame arriving at the PHY, on HWICs that do not store the entire frame before passing it up to the host.

The Optional Rx Flags byte is also placed in to the receive buffer and counted in the Data Length field of the Receive Buffer Descriptor, so if the Rx Flags functionality is not needed this byte may be used for frame data as long as the host processor ignores the Rx Flags in the Receive Buffer Descriptor (word 1 bits 23–22). This byte does not provide any special functionality for the transmit direction, and should be used for valid frame data.

CRC8: 8-bit CRC calculated on all frame bytes except the CRC8 field itself. Additionally, the CRC8 is NOT calculated over any inserted control frames.

DMA Frames

The DMA frames will now be described. There are three types of DMA transactions: HWIC-to-host DMA Read Request, Host-to-HWIC DMA Read Response, and HWIC-to-host DMA Write Request. All DMA transactions are initiated by the host. Each of these frame formats will now be described.

The format of the HWIC-to-host DMA Read Request Frame is depicted in FIG. 10.

DMA Read Opcode: This byte should be set to 0x61 to indicate that the HWIC is requesting a DMA read from the host.

Address: 32-bit start address for the DMA operation in host memory space.

Length: 16-bit length in bytes of the requested DMA read—how much memory the host should read and send back to the HWIC.

CRC8: 8-bit CRC calculated on all frame bytes except the CRC8 field itself. Additionally, the CRC8 is NOT calculated over any inserted control frames.

The Host-to-HWIC DMA Read Response Frame will now be described with reference to FIG. 11. This frame is sent from the host to the HWIC in response to the "HWIC-to-host DMA Read Request" frame.

DMA Read Response Opcode: This byte should be set to 0x62 to indicate that this is a "host-to-HWIC DMA Read Response" frame.

Address: 32-bit start address for the DMA operation in host memory space.

Length: 16-bit number of bytes to follow in the "data" field.

Header CRC8: 8-bit CRC calculated on all previous frame bytes except the "Header CRC8" field itself.

Data: Data bytes from host memory.

Frame CRC8: 8-bit CRC calculated on all frame bytes except the CRC8 field itself. Additionally, the CRC8 is NOT calculated over any inserted control frames.

The HWIC-to-host DMA Write Request Frame will now be described with reference to FIG. 12.

DMA Write Opcode: This byte should be set to 0x66 or 0x67 to indicate that the HWIC is requesting a DMA write to the host.

0x66=Do not interrupt the host after this DMA transaction is completed

0x67=DO interrupt the host after this DMA transaction is completed.

If opcode 0x67 is used, the host termination logic will interrupt the host CPU after all the data has been received and sent to host memory or the host memory controller. Note that this does not necessarily guarantee the data will be completely written to host memory before the host CPU is interrupted; however, in this event it is the intention of opcode 0x67 to minimize the latency between the interrupt and the memory write completion as much as can reasonably be achieved. This will enhance system performance by minimizing instances that the CPU must abort and re-try later (when it receives the 0x67 interrupt but then discovers that the required data is not in memory yet).

Address: 32-bit start address for the DMA operation in host memory space. Note: The host termination logic will implement an address mask function to protect various sections of host memory from accidental/erroneous HWIC writes.

Length: 16-bit number of bytes to follow in the "data" field.

Header CRC8: 8-bit CRC calculated on all previous frame bytes except the "Header CRC8" field itself.

Data: Data bytes to write to host memory.

Frame CRC8: 8-bit CRC calculated on all frame bytes (i.e. starting with "Command Opcode") except the "Frame CRC8" field itself.

Buffer Address Extension

As described above, several host memory data structures are associated with HWIC and all of these data structures are shared by the host processor and host termination logic through DMA accesses.

Transmit and Receive Buffer Descriptors are host data structures that include a 32-bit Buffer Address in host memory of the buffer which contains the data to be transferred using Generic Data Frames.

This embodiment includes Transmit and Receive Buffer Address Extension registers that allow extension of the Buffer Address held in a descriptor by an additional 8 bits. If the host termination logic does not support more than 32 bits of host address space this register holds a value of zero.

If address extension is supported then the HWIC termination logic uses the 8 transmit buffer extension bits to extend the Buffer address to a 40-bit address as shown here:

{"Transmit Buffer Extension (8 bits)", "Transmit Buffer Address (32 bits)"}={"Extended Address" (40 bits)}

Components of the invention may be implemented as program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. For example, the formats of the various frames are described by way of example and other frame formats can be utilized as is known in the art. Further, the pins of the legacy interface that are appropriated for the high-speed interface will vary depending on the pin functions of the legacy interface. Accordingly, it is not intended to limit the invention except as provided by the appended claims.

What is claimed is:

1. A double-data rate (DDR) bus system for use in a host-daughtercard interface that is pin compatible with a legacy interface used to interface a legacy daughtercard with the host, with legacy interface including a parallel port utilized by the host to write values to registers on the daughtercards, with the parallel port utilizing a subset of pins on a host-daughtercard connector, with the bus system comprising:

a daughtercard termination logic block, coupled to the subset of pins previously used for the parallel port that redefines the subset of pins as a set of receive pins, a receive control pin, a receive clock pin, a set of transmit pins, a control pin, and a transmit clock pin;

a host termination logic block, coupled to the subset of pins previously used for the parallel port that redefines the subset of pins as a set of receive pins, a receive control pin, a receive clock pin, a set of transmit pins, a transmit control pin, and a transmit clock pin;

where the daughtercard termination logic implements DMA transfers between memory or registers on the daughtercard and host memory, and where packet data is transferred using generic data frames, where control is asserted utilizing control frames, and where a control signal is asserted on the control pin to indicate control frames;

where the host termination logic utilizes read and write frames to implement the function of the legacy parallel port to read and write data to daughtercard registers, where packet data is transferred using generic data frames, where DMA data is transferred using DMA data frames, where control is asserted utilizing control frames, and where a control signal is asserted on the control pin to indicate control frames.

2. The system of claim 1 where:

the daughtercard termination logic utilizes an interrupt control frame to interrupt a processor on the host.

3. The system of claim 1 where:

the host interface and daughtercard interface implement flow control by inserting idle control bytes in the middle of a data frame to prevent data frames from underrunning.

4. The system of claim 1 where:

host memory includes buffer descriptors with an address field having a specified number of bytes; and where the daughtercard includes an extension register holding bits which are concatenated with an address held in a buffer descriptor to extend the address held in the buffer descriptor.

5. The system of claim 1 where the legacy interface includes a serial peripheral interface coupled to a second subset of pins on host-daughtercard connector, and where:

the daughtercard includes a non-volatile memory for storing daughtercard identification information including information indicating whether the daughter card implements the legacy interface or the DDR bus; and where:

the host termination logic block utilizes the legacy serial peripheral interface to read non-volatile memory on the daughtercard and configures the first set of pins as the legacy parallel port if the daughtercard identification indicates that the daughtercard supports the legacy interface or configures the first set of pins as the DDR bus if the daughtercard identification indicates that the daughtercard supports the DDR bus interface.

6. A bus system comprising:

a host that is pin compatible with a legacy bus that defines a parallel port and a serial bus, with the host including:

means for interfacing with the serial bus;

means, coupled to the means for interfacing with the serial bus, for determining whether a connected daughtercard is a legacy daughtercard or a high-speed daughtercard;

means for redefining a set of the pins to implement a double-data rate (DDR) bus when a high-speed daughtercard is detected; and a high speed daughtercard including:

means for implementing the DDR bus and the serial bus;

means for providing identification information that allows the host bus interface to determine whether a high-speed daughtercard is connected; and means for utilizing read and write transactions to implement the functions of the parallel port.

7. The system of claim 6 further comprising:

at the daughtercard:

means for utilizing an interrupt control frame to interrupt the host.

8. The system of claim 6 where the host includes a memory holding buffer descriptors with an address field having a specified number of bytes, the system further comprising:

at the daughtercard:

means for extending the address held in the buffer descriptor using bits held at the daughtercard.

* * * * *